United States Patent [19]

Tobey

[11] 4,175,484
[45] Nov. 27, 1979

[54] FOOD SMOKING

[76] Inventor: Frederic S. Tobey, P.O. Box L, Brewster, Mass. 02631

[21] Appl. No.: 918,461

[22] Filed: Jun. 23, 1978

[51] Int. Cl.$^2$ .............................................. A23B 4/04
[52] U.S. Cl. ...................... 99/482; 126/59.5; 99/467; 192/46; 192/56 L
[58] Field of Search ................... 99/467, 481, 482; 126/59.5, 79, 73; 74/154, 155, 167, 575–577 S, 578

[56] References Cited

U.S. PATENT DOCUMENTS

| 742,198 | 10/1903 | Josten | 126/73 |
|---|---|---|---|
| 1,447,401 | 3/1923 | Alsop | 99/482 X |
| 2,677,038 | 4/1954 | Reynoldson | 99/482 X |
| 2,912,974 | 11/1959 | Wahnish | 126/59.5 |
| 3,000,373 | 9/1961 | Hawley | 126/59.5 |
| 3,009,457 | 11/1961 | Rasmussen et al. | 126/59.5 |
| 3,462,282 | 8/1969 | Fessman | 99/467 X |

Primary Examiner—Leonard D. Christian

[57] ABSTRACT

In one aspect a smoking apparatus comprises a container for a stack of smoke-producing members such as hardwood pieces, a guide retort having an inlet, a pair of vertically spaced guide surfaces the upper of which is perforated, and an outlet, means for drawing successive members into the retort, heating means positioned adjacent to and outside of the guide retort, and a food enclosure positioned to receive smoke passing through the perforated upper guide surface of the retort. In another aspect a strain-relief mechanism is described which is useful in preventing damage to the smoking apparatus should, e.g., a warped piece of wood cause a jam in the apparatus.

19 Claims, 4 Drawing Figures

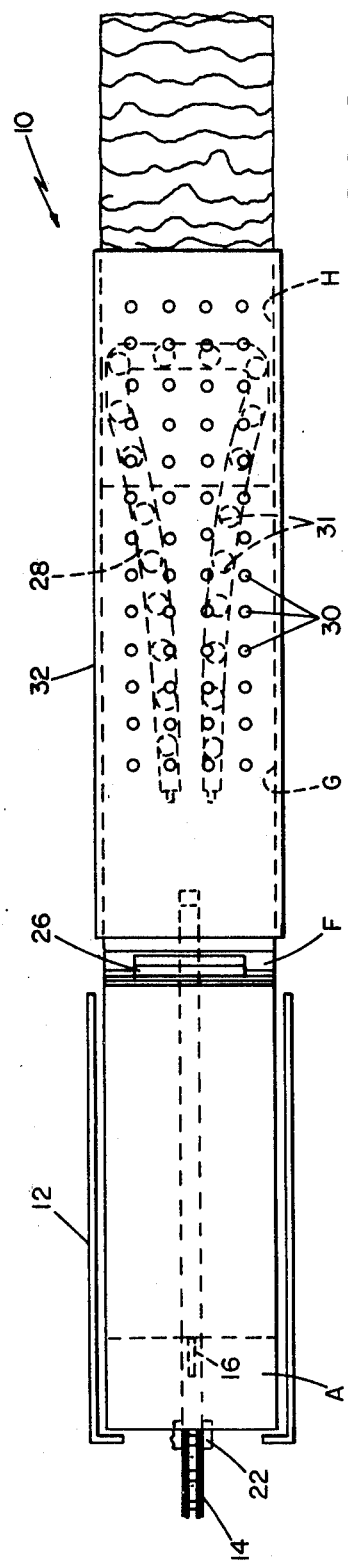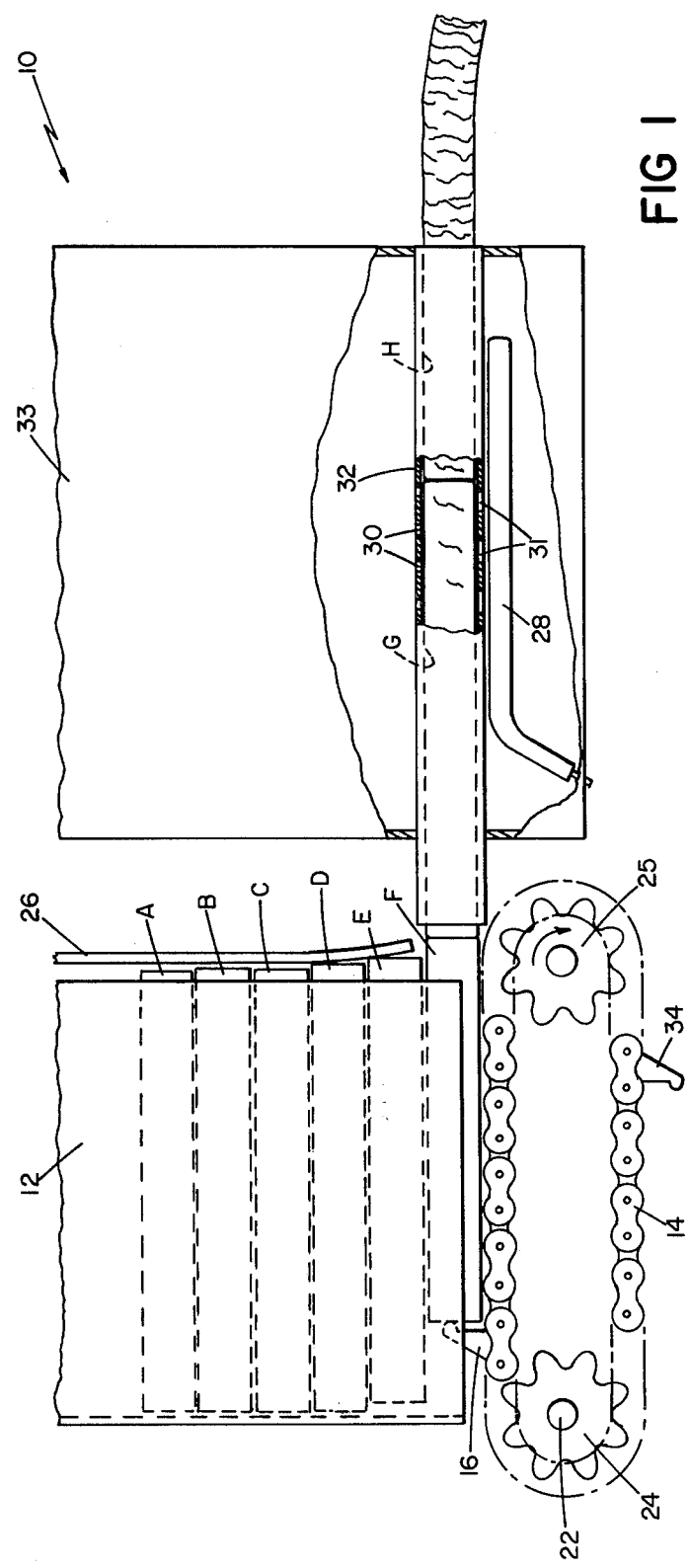

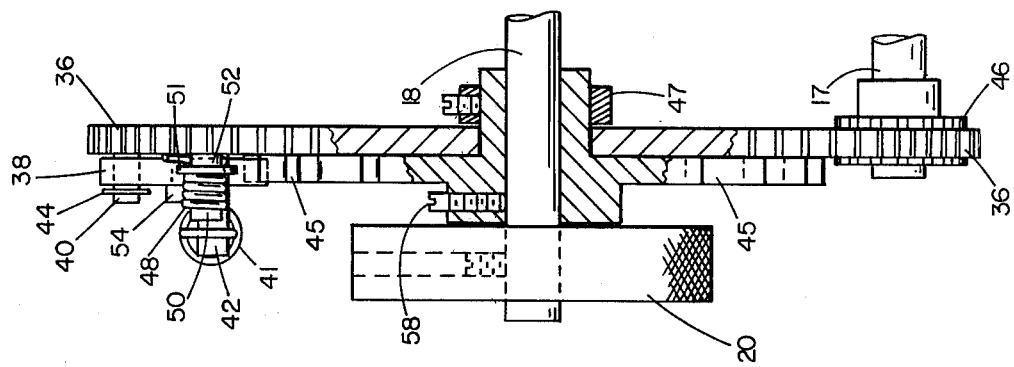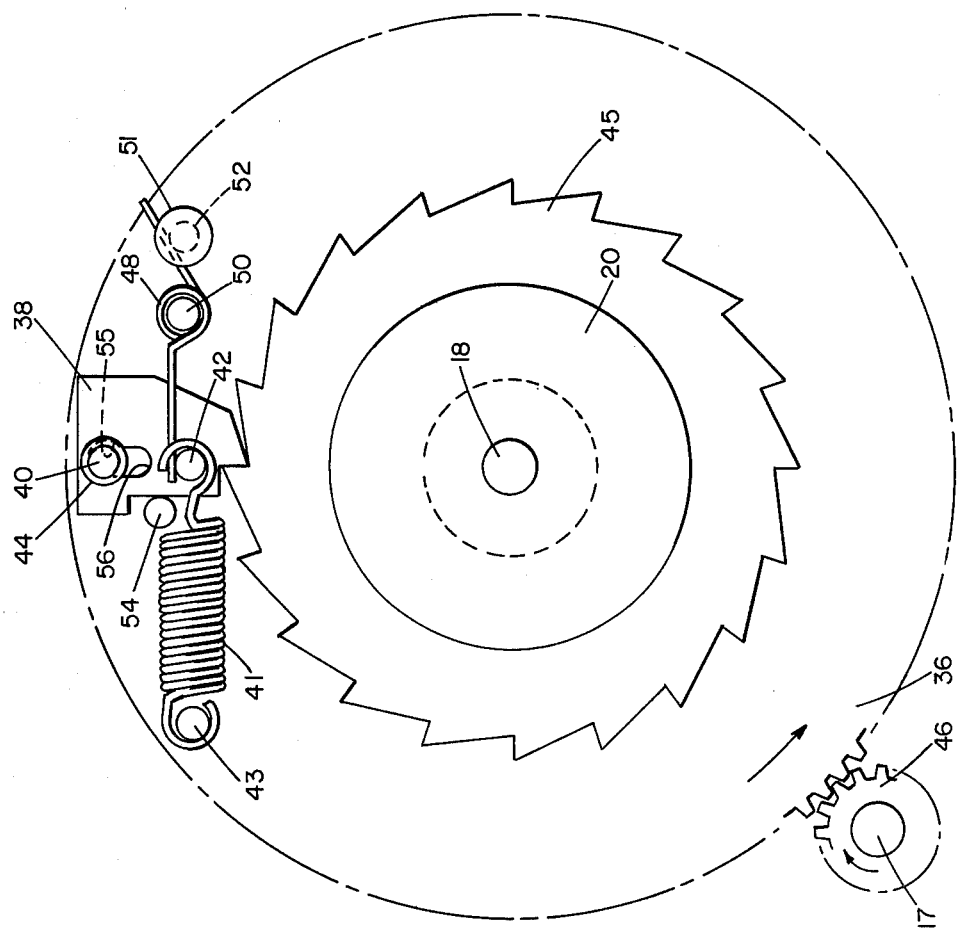

FOOD SMOKING

In the smoking of foods to preserve them and enhance their flavor, it is traditional to provide a firebox in which hardwood, usually in rough-cut pieces but sometimes in the form of sawdust, is burned in a low-oxygen atmosphere (to produce a large volume of smoke), and an adjacent enclosure where the meat, fish, cheese or other food is hung or placed on racks so as to be exposed to the smoke thus produced.

This method of preserving and flavoring foods is believed to be as old as cooking itself. For the most part, the apparatus used for producing the smoke has been similar to that of very early times. However, certain mechanisms, designed to improve the process, have been patented. Alsop U.S. Pat. No. 1,447,401 discloses a meat smoker in which sawdust traveling on a perforated endless element and optionally enclosed within side walls and an upper stationary screen is heated by an imperforate plate in turn heated from below. Hawley U.S. Pat. No. 3,000,373 discloses a meat smoker in which logs are advanced against a friction wheel. Josten U.S. Pat. No. 742,198 discloses automatic feeding of layer after "layer of fuel". Reynoldson U.S. Pat. No. 2,677,038 discloses continuous feeding of sawdust by a screw in a meat smoker.

In recent years there has been a great increase in outdoor home cooking, and small "smokehouses" designed for home use have been offered for sale. Some are electric, having a heating element that cooks the food and at the same time produces smoke from chunks of hardwood placed on the element. Others employ charcoal for heat, the hardwood chunks or sawdust being placed on the charcoal.

It is necessary for the user to give periodic attention to these devices while the smoking is in progress, replacing consumed hardwood chunks, adjusting drafts, and so on. Furthermore, the hardwood burns faster than is intended, producing too much heat and too little smoke.

SUMMARY OF THE INVENTION

In one aspect of my invention I have found that if hardwood pieces of uniform size and shape (as, for example, pieces cut from standard hardwood flooring), are stacked in a power-driven feeding device and are fed slowly, one after another, into a heated area from which air is largely excluded, such a large volume of smoke will be produced from each piece that a relatively small stack of wood will provide smoke continuously, without any attention from an operator, for twelve hours or more. Furthermore, as the smoke is produced at a uniform rate over the entire period, the quality of the smoking is exceptionally good. The heated area includes a guide retort having an inlet for receiving successive pieces, a pair of vertically spaced guide surfaces for guiding the pieces through the retort, and an outlet for permitting expelling of the residue from the pieces—high quality charcoal. The upper of the guides surfaces is perforated to allow smoke to pass from the retort to an enclosure containing the food to be smoked.

In another aspect of my invention I have devised a strain-relief linkage for preventing damage to my smoking apparatus should a jam occur, as from a warped piece of wood. The linkage includes a ratchet shaft for transmitting power to the feeding device, a driven gear connected to a motor or other driving means and rotatably mounted on the ratchet shaft, a ratchet fixedly mounted on the ratchet shaft, and a pawl pivotally mounted on the driven gear and biased by a first spring into the ratchet whereby, in a first, normal operation mode, the pawl engages the ratchet and the ratchet shaft rotates with the driven gear to drive the feeding device, and in a second, jam mode, the pawl is pivotally biased by the ratchet against the first spring bias to permit the pawl to successively ride over the ratchet teeth to allow the driven gear to rotate while a jam prevents the ratchet and ratchet shaft from rotating with the driven gear. In a preferred embodiment the pawl is slotted, pivots about a pawl bearing pin fixed on the driven gear and extending through the slot, and is biased by a second spring inwardly into the ratchet, whereby in a third mode the pawl can be slidably moved upwardly against the second spring to allow rotation of the ratchet and ratchet shaft independently of the driven gear.

For hardwood I generally use untreated tongue-and-groove oak flooring, which is three-quarters of an inch thick and two and seven sixteenths inches wide over all, cutting it into six inch lengths. Similar standard floorings of other hardwoods, such as maple, also produce goods results. If desired, the pieces may be made from compressed sawdust, corncob chips, or a combination of these or other materials suitable for producing the desired smoke.

Using my method, the smoking of any food can be initiated with a minimum of time and effort, no attention is required of the user during the smoking period, and little or no cleanup is necessary after the smoking. An important safety feature is that any smoldering wood in the device is self-extinguishing whenever the switch for the electric heating element is turned off. Thus there is no lingering fire, after the smoking, to create a hazard.

An additional benefit, in my device, is the production of high quality charcoal, which can be used in a charcoal grille, hibachi, or any other device in which charcoal is the source of heat. Because the smoke and gases are distilled from the wood without burning, the resulting residue is charcoal. Twelve hours of smoking produces about enough charcoal for more than an hour of cooking in a small grille.

BRIEF DESCRIPTION OF THE DRAWINGS

FIG. 1 is a side elevation view of the presently preferred embodiment of the invention in its smoking apparatus aspect;

FIG. 2 is a plan view of the apparatus of FIG. 1;

FIG. 3 is a side elevation view of the presently preferred embodiment of the invention in its manual advancement and strain-relief apparatus aspect; and FIG. 4 is a front elevation view, partly broken away, of the apparatus of FIG. 3.

DESCRIPTION OF THE PREFERRED EMBODIMENTS

In FIG. 1, six-inch lengths of hardwood flooring A through F are shown stacked in a housing 12 of smoker 10. Conveyor chain 14 is driven by a gearmotor and train of gears (not shown) at such speed that pusher 16 causes hardwood piece F to move to the right at a speed of approximately six inches per hour. I use a gearmotor with an output shaft 17 (FIGS. 3 and 4) of 1 R.P.M. (Dayton Gearmotor, sold by W. W. Grainger, Inc., under the Stock No. 3M095, 115 Volts, A.C.), geared down 10 to 1 to a countershaft 18, on which I have mounted a knob 20 for manually advancing the mechanism and a device for strain-relief (both described below in further detail in FIGS. 3 and 4), the speed of countershaft 18 being reduced by gearing it 4-to-1 to a third shaft 22 (FIG. 1). On the third shaft 22 is a sprocket 24 having a pitch diameter of 1.21 inches, which drives conveyor chain 14 at a speed of 5.7 inches per hour around sprockets 24 and 25.

Gate plate 26 is angled to the right at its lower end to prevent any tendency of the successively dropping pieces of hardwood to be held frictionally against its surface.

Hardwood pieces G and H are being moved to the right by F, and as they pass over electric heating element 28, smoke is distilled from the wood and emerges through holes 30 (3/32 inch diameter; see FIG. 2) in the top of stainless steel guide retort 32.

Twenty spaced holes 31 (¼ inch diameter) located in the underside of guide retort 32 and aligned over heating element 28 allow direct radiation from the heating element to the wood pieces for improved heat transfer to the pieces.

Heating element 28 may typically be the heater manufactured by Edwin L. Wiegand Division of Emerson Electric Co., designated as Chromalox Tubular Heater No. TRI 1612, 255 watts.

Retort 32 is so dimensioned that it provides ample room for the passage of the wood, but a minimum of space for air around the wood. The top of retort 32 is removable (not shown) for cleaning. An enclosure 33 (shown diagramatically and partly broken away in FIG. 1) for the food is positioned above retort 32 to receive the smoke freely issuing from the retort through holes 30.

Because there is no free flow of air around the wood, the extracted gases do not burn and as a result a very large volume of smoke is produced, compared to the volume of the wood. Although holes 31 let some air into the retort, the amount does not impair the smoking process, and any disadvantage is in any event outweighed by the advantage of direct radiation heating through the holes.

When hardwood piece F reaches approximately the position shown for piece G, piece E, no longer supported by F, drops into the position formerly occupied by F. Presently pusher 34 begins to move E to the right, and E in turn presses F in a continuing rightward movement. F in its turn begins to produce smoke as it senses the heat of element 28.

The amount of heat from element 28 and the rate of movement of the hardwood pieces are such that by the time each piece has passed completely over element 28, all of its potential smoke has been extracted, and the resulting residue is charcoal. The charcoal (e.g., the residue from piece H) will continue to be pushed to the right, and presently will be ejected from the retort and will fall into whatever receptacle may be so placed as to catch it. As stated earlier, the accumulated charcoal may be stored and burned later in a grille or other cooking device.

If the user places a warped piece of wood in the stack, the warped piece may stick as it goes into the opening defined by the gate plate 26, and jam the mechanism. To prevent damage to the mechanism, strain relief is provided by the elements shown in FIGS. 3 and 4. If a jamming situation occurs, driven gear 36 will continue its normal rotation, but the lower end of pawl 38 will move to the right relative to pawl bearing pin 40, stretching tension spring 41, which is hooked between pin 42, which is fixedly mounted on pawl 38, and spring stud 43, the latter fixedly mounted on driven gear 36. Pawl 38 is retained on pin 40 by snap retaining ring 44. Presently pawl 38 will ride over the tooth of ratchet 45, and will snap back into its normal position. This sequence will be repeated as pawl 38 encounters successive teeth of ratchet 45, until the user stops the motor (which is driving pinion gear 46) and removes the warped piece of wood.

Normally, driven gear 36 and ratchet 45 turn together as a unit. Driven gear 36 is retained next to ratchet 45 by collar 47. Torque spring 48, whose coil is centered on rod 50, and is held there by torque spring retainer 51 and torque spring stop 52, maintains downward pressure on pin 42, maintaining the engagement of pawl 38 with ratchet 45. Pawl bearing pin 54 limits the leftward travel of pawl 38. Slot 56 enables the user to move pawl 38 out of engagement with ratchet 45 at will by pressing pin 42 in a direction away from the ratchet center. The user may then turn ratchet 45 and shaft 18, to which it is attached by set screw 58, freely in either direction, using hand knob 20. When knob 20 is turned clockwise, the pusher is backed away from the wood to permit clearing a jam easily.

Rightward extension 55 of slot 56, which acts as a stop and bearing surface in the event of a jam, assures that pawl 38 will continue to pivot correctly on pin 40 as spring 41 is stretched.

When loading the device with wood, it may be desired to move the first piece of wood into position over the heating element quickly, without waiting for the chain to carry it forward. For this purpose hand knob 20 may be turned counter-clockwise without manipulating pin 42, because slot 56 will permit pawl 38 to rise on the ratchet teeth against the pressure of spring 48.

As above described, the apparatus produces "cold smoking," so-called, in which the food is chemically "cooked" by the constituents of the smoke, but generally is not heated to a temperature great enough to result in cooking by heat. Such "smoke cooking" typically takes from several hours to a number of days.

When it is desired to cook at a faster rate, while smoking the food, additional electric heating elements may be employed, remote from the wood, to bring the oven section up to higher temperature. The additional elements may be turned on and off automatically, by a thermostat, in the manner of controlling a kitchen oven. In this way food may be cooked, and at the same time be given a smoky flavor, in an hour or so.

In my most preferred embodiment I add a third sprocket below and intermediate of sprockets 24 and 25 and make the third sprocket the driving sprocket (permitting positioning of the gearmotor, gear train, and strain-relief mechanism below and out of the way of the rest of the smoking apparatus) and add a third pusher for varying the spacing between pushers for the most efficient delivery (without substantial delay) of the next piece of wood.

I claim:
1. A smoking apparatus comprising:
a container for a stack of smoke-producing members,
a guide retort,
said guide retort having
an inlet for receiving successive members from said stack, a pair of vertically spaced guide surfaces for guiding successive members therebetween, and an outlet for permitting expelling of members guided through said retort by said guide surfaces, the upper of said guide surfaces having a plurality of holes therethrough for permitting smoke from said members to leave said retort, means to drive successive members of said stack into said guide retort, heating means positioned adjacent to and outside of said guide retort, and a food enclosure positioned adjacent to said guide retort to receive smoke passing through the holes of said upper guide surface.

2. The apparatus of claim 1 wherein said means to drive comprises a chain and sprocket drive and a pusher located along the length of said chain and protruding outwardly from the periphery of said chain to engage successive members of said stack and push them horizontally.

3. The apparatus of claim 2 wherein said means to drive includes at least two pushers spaced apart sufficiently along the length of said chain to individually engage successive members of said stack and push them horizontally.

4. The apparatus of claim 1 wherein said container includes a vertically extending gate plate on one side thereof and and outlet below said gate plate for permitting the bottom member of said stack to be driven by said means to drive through said outlet to said guide retort, said gate plate being bent outwardly at its downward portion away from said stack.

5. The apparatus of claim 1 wherein said heating means is positioned beneath said guide retort and the lower of said guide surfaces has a plurality of holes therethrough for permitting direct radiation from said heating means to said smoke-producing members.

6. The apparatus of claim 1 wherein said means to drive includes strain-relief means for preventing said means to drive from driving said members should one or more of said members jam in said apparatus.

7. The apparatus of claim 6 wherein said means to drive further includes means to push successive said members into said guide retort and said strain-relief means comprises:

a ratchet shaft for actuating said means to push, a driven gear rotatably mounted on said ratchet shaft, means for driving said driven gear, a ratchet fixedly mounted on said ratchet shaft for rotation with said driven gear in a normal operation first mode, a pawl pivotally mounted on said driven gear, and a first spring pivotally biasing said pawl into said ratchet, whereby, in said first mode, said pawl engages said ratchet, said ratchet and said ratchet shaft rotate with said driven gear as said driven gear is driven by said means for driving, and said ratchet shaft actuates said means to push, and in a second mode, when one or more of said members jam and thereby impede the operation of said means to push and impede the rotation of said ratchet shaft and said ratchet so that said ratchet cannot rotate freely with said driven gear, said pawl is pivotally biased by said ratchet against the bias of said first spring, thereby permitting said pawl to successively ride over the teeth of said ratchet and thereby permitting said driven gear to rotate while said ratchet shaft and ratchet are prevented from rotating therewith.

8. The apparatus of claim 7 wherein said pawl is outwardly slidably mounted on said driven gear and said strain-relief means further includes a second spring inwardly slidably biasing said pawl into said ratchet, whereby, in a third mode, said pawl can be slidably moved upwardly from said ratchet against said second spring to permit rotation of said ratchet and ratchet shaft clockwise or counterclockwise, independently of said driven gear.

9. A strain-relief linkage between a driving means and a load to be driven comprising:

a ratchet shaft connected to drive a load, a driven gear rotatably mounted on said ratchet shaft and connected to be driven by a driving means, a ratchet fixedly mounted on said ratchet shaft for rotation with said driven gear in a normal operation first mode, a pawl pivotally mounted on said driven gear, and a first spring pivotally biasing said pawl into said ratchet, whereby, in said first mode, said pawl engages said ratchet, said ratchet and said ratchet shaft rotate with said driven gear as said driven gear is driven by said driving means, and said ratchet shaft drives said load, and in a second mode, when a jam prevents said load from being driven and thereby impedes rotation of said ratchet shaft and said ratchet so that said ratchet cannot rotate freely with said driven gear, said pawl is pivotally biased by said ratchet against the bias of said first spring, thereby permitting said pawl to successively ride over the teeth of said ratchet and thereby permitting said driven gear to rotate while said ratchet shaft and ratchet are prevented from rotating therewith.

10. The strain-relief linkage of claim 9 wherein said pawl is outwardly slidably mounted on said driven gear and further including a second spring inwardly slidably biasing said pawl into said ratchet, whereby, in a third mode, said pawl can be slidably moved upwardly from said ratchet against said second spring to permit rotation of said ratchet and ratchet shaft clockwise or counterclockwise, independently of said driven gear.

11. The linkage of claim 10 wherein said first spring is a tension spring and said second spring is a torque spring.

12. The linkage of claim 11 wherein said pawl has a slot therein and further including a pawl bearing pin fixedly mounted to one face of said driven gear and extending through said slot to permit said pawl to pivot thereabout.

13. The linkage of claim 12 wherein said slot has an enlarged rounded portion for permitting said pawl bearing pin to bear against said rounded portion when said pawl is pivotally biased away from said first spring by said ratchet in said second mode.

14. The linkage of claim 10 further including a knob fixedly mounted on said ratchet shaft for rotating said ratchet shaft in said first mode independently of said driven gear and in said third mode.

15. The apparatus of claim 1 wherein said guide retort further includes a pair of horizontally spaced guide surfaces for laterally guiding said members through said retort.

16. The apparatus of claim 3 wherein said means to drive includes three sprockets two of which are positioned horizontally apart and the third of which is positioned below and between the first two sprockets and three pushers spaced along said chain, which is looped about all three of said sprockets, the position of said pushers along said chain being variable to permit efficient delivery of successive members.

17. The apparatus of claim 15 wherein said horizontally and vertically spaced guide surfaces are spaced apart sufficiently to allow said members to pass freely therebetween but are spaced close enough together to minimize space for air around said members.

18. The apparatus of claim 17 wherein said guide retort is rectangular in cross section.

19. A smoking apparatus comprising:
a container for a stack of smoke-producing members,
a guide retort,
said guide retort having
   an inlet for receiving successive members from said stack,
   a pair of vertically spaced guide surfaces for guiding successive members therebetween,
   an outlet for permitting expelling of members guided through said retort by said guide surfaces, and
   means for permitting smoke from said members to leave said retort,
means to drive successive members of said stack into said guide retort,
heating means associated with said guide retort, and
a food enclosure positioned adjacent to said guide retort to receive smoke.

* * * * *